(12) United States Patent
Kremser

(10) Patent No.: US 9,051,133 B2
(45) Date of Patent: Jun. 9, 2015

(54) DEVICE FOR SUPPLYING SECURING ELEMENTS

(71) Applicant: MAGNA STEYR Fahrzeugtechnik AG & Co KG, Graz (AT)

(72) Inventor: Walter Kremser, Vasoldsberg (AT)

(73) Assignee: MAGNA STEYR Fahrzeugtechnik AG & Co KG, Graz (AT)

(*) Notice: Subject to any disclaimer, the term of this patent is extended or adjusted under 35 U.S.C. 154(b) by 224 days.

(21) Appl. No.: 13/863,657

(22) Filed: Apr. 16, 2013

(65) Prior Publication Data

US 2013/0272804 A1   Oct. 17, 2013

(30) Foreign Application Priority Data

Apr. 16, 2012  (DE) .......................... 10 2012 206 203
Jul. 17, 2012   (DE) .......................... 10 2012 212 502

(51) Int. Cl.
  *B65G 53/22*  (2006.01)
  *B65G 51/02*  (2006.01)
  *B21J 15/32*  (2006.01)
  *B23P 19/00*  (2006.01)

(52) U.S. Cl.
  CPC .............. *B65G 51/02* (2013.01); *B21J 15/32* (2013.01); *B23P 19/001* (2013.01); *B21J 15/323* (2013.01)

(58) Field of Classification Search
  USPC ........................... 406/19, 25, 76, 95, 120, 192
  See application file for complete search history.

(56) References Cited

U.S. PATENT DOCUMENTS

| | | | | |
|---|---|---|---|---|
| 4,813,818 A | * | 3/1989 | Sanzone | 406/122 |
| 5,913,656 A | * | 6/1999 | Collins | 414/801 |
| 5,950,864 A | * | 9/1999 | Cash et al. | 221/227 |
| 6,116,821 A | * | 9/2000 | Teoh et al. | 406/137 |
| 6,116,822 A | * | 9/2000 | Teoh et al. | 406/180 |
| 6,120,216 A | * | 9/2000 | Teoh et al. | 406/124 |
| 6,210,079 B1 | * | 4/2001 | Teoh et al. | 406/12 |
| 6,210,081 B1 | * | 4/2001 | Saho et al. | 406/134 |
| 6,216,845 B1 | * | 4/2001 | Polese | 198/398 |
| 6,390,736 B2 | * | 5/2002 | Rassman et al. | 406/180 |
| 6,443,669 B2 | * | 9/2002 | Saito | 406/28 |
| 6,588,576 B1 | * | 7/2003 | Roessler | 198/389 |
| 6,666,626 B2 | * | 12/2003 | McMahon et al. | 406/50 |
| 6,726,408 B2 | * | 4/2004 | McMahon et al. | 406/50 |
| 7,284,934 B2 | * | 10/2007 | Hoogers | 406/176 |
| 2011/0239448 A1 | | 10/2011 | Sarh | |

FOREIGN PATENT DOCUMENTS

DE   102005041534 A1   3/2007
DE   10 2010 053 220 A1   6/2012

* cited by examiner

*Primary Examiner* — Joseph Dillon, Jr.
(74) *Attorney, Agent, or Firm* — Jordan IP Law, LLC; Todd A. Vaughn

(57) ABSTRACT

A device configured to supply securing elements to a processing unit. The device includes at least two provision channels configured to secure elements of different types, by way of which the securing elements are conveyed into a common supply unit, and a processing channel through which the securing elements are conveyed individually from the supply unit to the processing unit. The securing elements are acted on with variable compressed air in the processing channel in order to convey the securing elements to the processing unit, the pressure of the compressed air being adjustable in accordance with the specific type of the respective securing element.

19 Claims, 4 Drawing Sheets

DEVICE FOR SUPPLYING SECURING ELEMENTS

CROSS-REFERENCE TO RELATED APPLICATIONS

The present application claims priority under 35 U.S.C. §119 to German Patent Application Nos. DE 10 2012 206 203.3 (filed on Apr. 16, 2012) and DE 10 2012 212 502.7 (filed on Jul. 17, 2012), which are each hereby incorporated by reference in their entireties.

TECHNICAL FIELD

Embodiments are directed to a device configured to supply securing elements to a processing unit, such as, for example, rivets to a set of riveting tongs.

Such a device includes at least two provision channels configured to secure elements of different types, and by which the securing elements are conveyed into a common supply unit, and a processing channel, through which the securing elements are conveyed individually from the supply unit to the processing unit.

Using such a device, various securing elements, in particular rivets, are conveyed to a processing unit, such as riveting tongs.

BACKGROUND

A device of the generic type is known from DE 10 2005 041 534 A1. This device for conveying connection elements to a processing device comprises a supply device, by means of which connection elements are provided individually, a conveying channel which connects the supply device to a loading device which is arranged on a processing device and an intermediate store which is arranged upstream of the loading device and which has at least two storage chambers which each have an inlet opening and an outlet opening, the portion of the conveying channel which leads to the supply device being able to be connected to any of the inlet openings of the storage chambers and the portion of the conveying channel which leads to the loading device being able to be connected to any of the outlet openings of the storage chambers.

Known devices for supplying securing elements are only suitable in a limited manner for use with securing elements of different types; therefore, only a few types of securing elements with the smallest possible number of differences with respect to the dimensions and the weight thereof are conventionally used.

SUMMARY

Embodiments are directed to an enhanced devices of the type mentioned in this regard and in particular to provide a device configured to supply securing elements to a processing unit which can process securing elements of different types, in particular, different geometry and different weight, in an optimum manner.

In accordance with embodiments, a device configured to supply securing elements to a processing unit, includes at least one of the following: at least two provision channels configured to secure elements of different types, and by which the securing elements are conveyed into a common supply unit; and a processing channel through which the securing elements are conveyed individually from the supply unit to the processing unit, the securing elements configured to be acted on with variable compressed air in the processing channel in order to convey the securing elements to the processing unit, the pressure of the compressed air being adjustable in accordance with the type of the respective securing element.

The device in accordance with embodiments has a plurality of provision channels, for example, approximately 5, 10 or even 30 provision channels, by which it is possible to provide, without refilling or converting the device, a maximum of as many different types of securing elements, for example, rivets, as corresponds to the number of provision channels. In order to convey the different securing elements in an optimum manner, that is to say, quickly and with little susceptibility to failure, to a processing unit, the device has a suitable device, apparatus, system or mechanism configured to guide the securing elements through the processing channel to the processing unit with different strengths of compressed air depending on their type.

For example, securing elements with a lower weight and those with a larger engagement face are conveyed by the device according to the invention transversely relative to the processing channel with a lower air pressure than those with a greater weight and/or smaller engagement face.

In accordance with embodiments, the device has securing elements configured to be acted on with variable compressed air in the common supply unit, the pressure of the compressed air being adjustable in accordance with the type of the respective securing element. The securing elements are thereby conveyed not only in the processing channel but already in the conveying unit by compressed air pressure which is adapted in each case to the type of the securing element.

Advantageously, the pressure of the compressed air is adjustable by way of a proportional valve. In this case, the device has at least one proportional valve, in particular when a plurality of compressed air supply hoses are used, also a plurality of proportional valves, in order to be able to adjust the pressure in a selective manner.

In accordance with embodiments, the common supply unit is formed by a supply channel, the provision channels opening into different portions of the supply channel. The portions may be arranged in series one behind the other on the supply channel. A separation from a plurality of provision channels for the use of the individual securing elements in the processing channel is thereby achieved in a simple and reliable manner.

In accordance with embodiments, the common supply unit is formed by a movable sliding member which is moveable in relation to the individual provision channels. Such embodiments have a small spatial requirement and enable the required securing elements to be collected in a selective manner from the provision channels. Using the movable sliding member, a large number of provision channels may also be readily approached.

In accordance with embodiments, the movable sliding member is preferably guided along a linear axis in an electrically actuated manner. Advantageously, precise control of the sliding member is also thereby possible for numerous provision channels.

The arrival of a securing element in the processing channel can preferably be detected by way of a sensor which may be arranged in particular at the end of the processing channel facing the supply unit. Advantageously, The supply of compressed air for the processing channel can thereby be started precisely at the appropriate time.

The type of the securing element may, for example, already be known to the control unit in that the securing element is collected or requested from provision channels whose securing element types are preconfigured.

The type of the securing element may also be able to be detected by way of a suitable sensor.

In accordance with embodiments, the provision channels each have a separation unit, the separation unit releasing the securing elements from a securing element belt, in particular from a rivet belt, and supplying them to the provision channel.

In accordance with embodiments, the separation unit preferably has a first actuator configured to release the securing elements from the securing element belt and a second actuator configured to further transport the securing element belt. The actuators may be constructed in particular as pneumatic cylinders.

In accordance with embodiments, the device may have a third actuator configured to alternately connect the processing channel to the common supply unit or to a compressed air source. In this manner, depending on the position of the actuator, either a securing element are received in the processing channel, or the securing element are conveyed through the processing channel by way of compressed air. Alternatively, the compressed air source may also be connected permanently to the processing channel by way of a compressed air supply hose and a suitable connection piece.

DRAWINGS

Embodiments are described by way of example below with reference to the drawings.

DESCRIPTION

Figure 1:
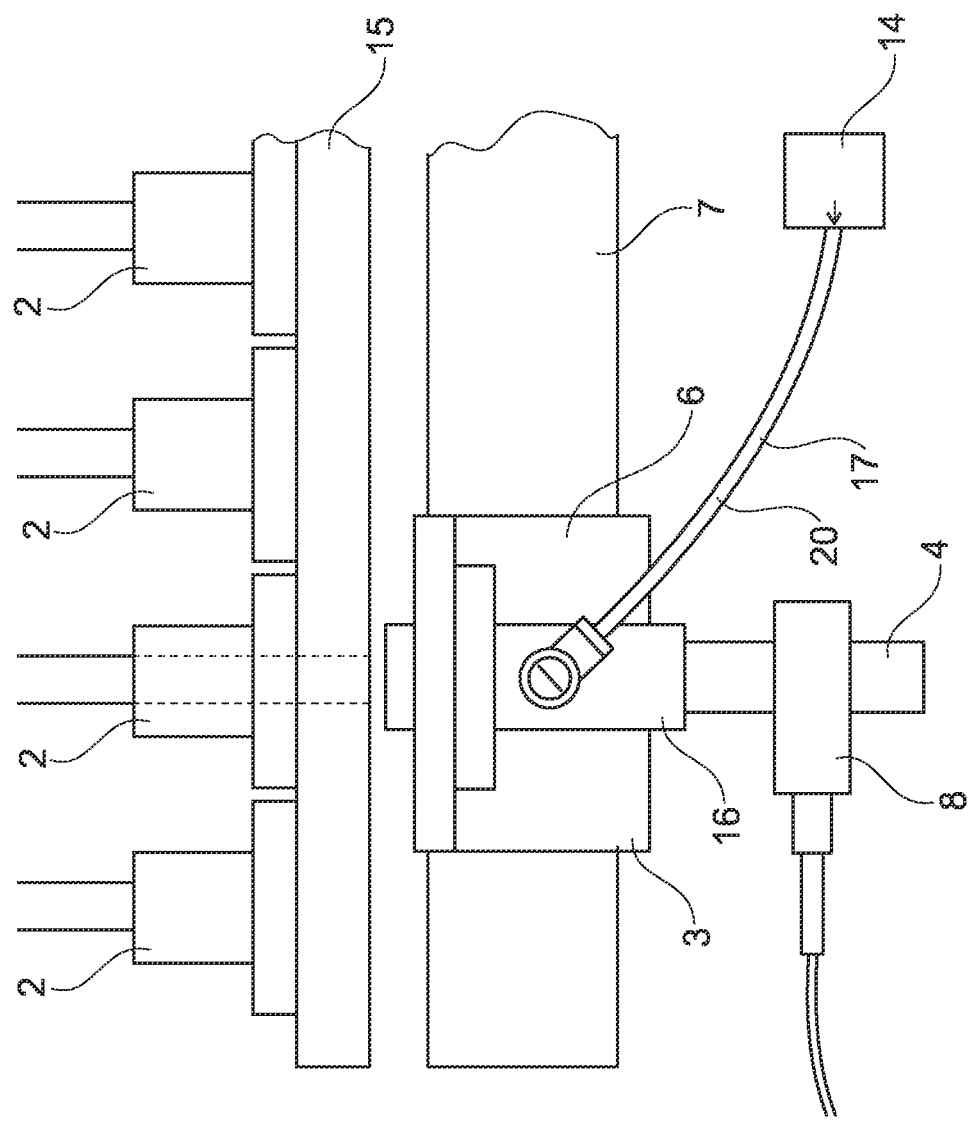
FIG. 1 is a schematic illustration of a device in accordance with embodiments.
Figure 3:
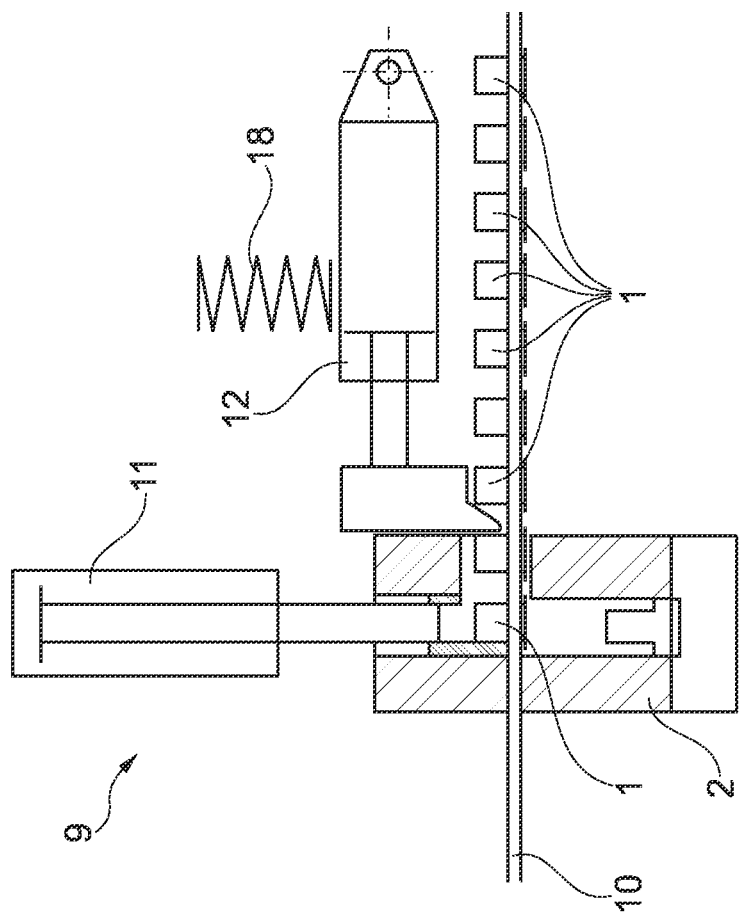
FIG. 3 is a schematic illustration of a separation unit for a device, in accordance with embodiments.

FIG. 1 is a schematic illustration of a device in accordance with embodiments. The device has a plurality of provision channels 2, which are configured to supply various rivets for each provision channel 2 to the supply unit 3. The provision channels 2 are secured to a common retention plate 15. The rivets may reach the provision channels 2, for example, by way of separation units 9, as illustrated in FIG. 3.

The supply unit 3 is formed by a movable sliding member 6, which are moved along a linear axis 7 in an electrically actuated manner. The movable sliding member 6 are positioned spatially below the individual provision channels 2 in order to collect a rivet from the selected provision channel 2 and allow the rivet to fall into the processing channel 4.

The movable sliding member 6 has a connection piece 16 configured to connect a compressed air supply hose 17. Hose 17 is configured to supply compressed air 20 from a compressed air source 14 to the connection piece 16 and subsequently to the processing channel 4.

A sensor 8 is configured so as to detect the arrival of a rivet as soon as it reaches the processing channel 4. The supply of compressed air 20 via the compressed air supply hose 17 is subsequently controlled by a control unit (not illustrated) by way of a proportional valve in accordance with the specific type of rivet.

Figure 2:
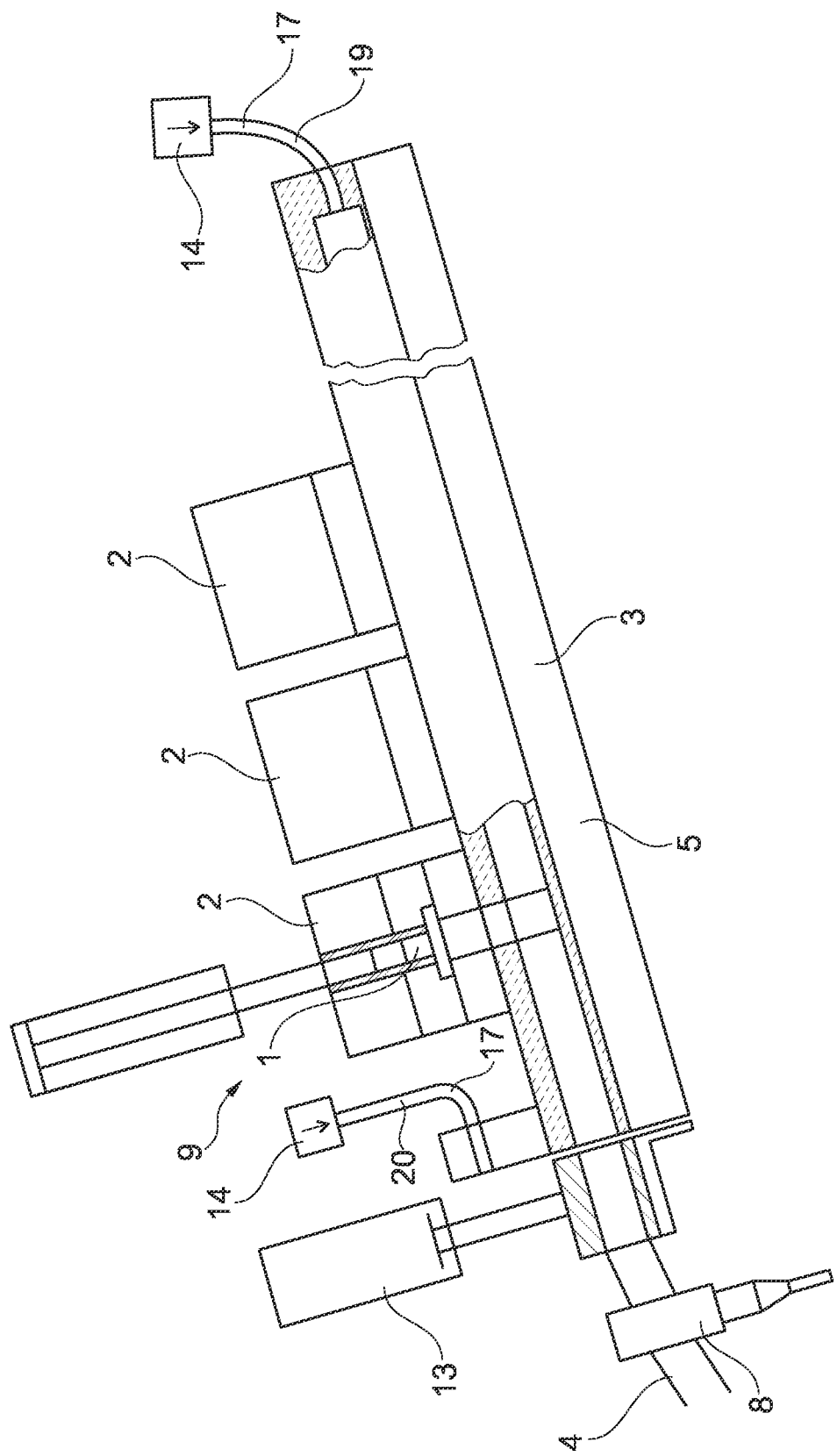
FIG. 2 is a schematic illustration of a device in accordance with embodiments.

FIG. 2 is a schematic illustration of a second embodiment of a device in accordance with embodiments. This device differs from the device of FIG. 1 in that a supply channel 5 is used as a supply unit 3. The supply channel 5 is a common channel in which all the provision channels 2 are in open communication. Rivets or other securing elements 1 are conveyed into portions of the supply channel 5 located one behind the other. Compressed air 20 for the supply unit 19 is supplied via a compressed air supply hose 17 at an end of the supply channel 5 facing away from the processing channel 4. That compressed air 20 supply may already be brought about in accordance with the specific type of securing element 1, and therefore, be carried out by way of a proportional valve (not illustrated), a separate sensor being able to be provided in the supply unit 3 for this purpose, if necessary.

If the rivet ultimately reaches the processing channel 4, a third actuator 13, which is constructed as a pneumatic valve produces a connection from the second compressed air source 14 which supplies the compressed air for the processing channel 20 to the processing channel 4. The specific type of securing element 1 is detected by the sensor 8 and the compressed air 20 is supplied from the compressed air source 14 via a proportional valve in accordance with the properties of the securing element 1 in order to blow the securing element 1 through the processing channel 4.

As illustrated in FIG. 3, a separation unit 9 comprises a first actuator 11 which is constructed as a pneumatic cylinder. A piston of the first actuator 11 is deployed in order to release a securing element 1 from a securing element belt 10. The securing element 1 which has been released subsequently reaches a provision channel 2. By way of a second actuator 12, which is also a pneumatic cylinder and which is loaded by a spring 18 in the direction towards the securing element belt 10, the securing element belt 10 is pushed further in order to keep the next securing element in a state of readiness.

Figure 4:
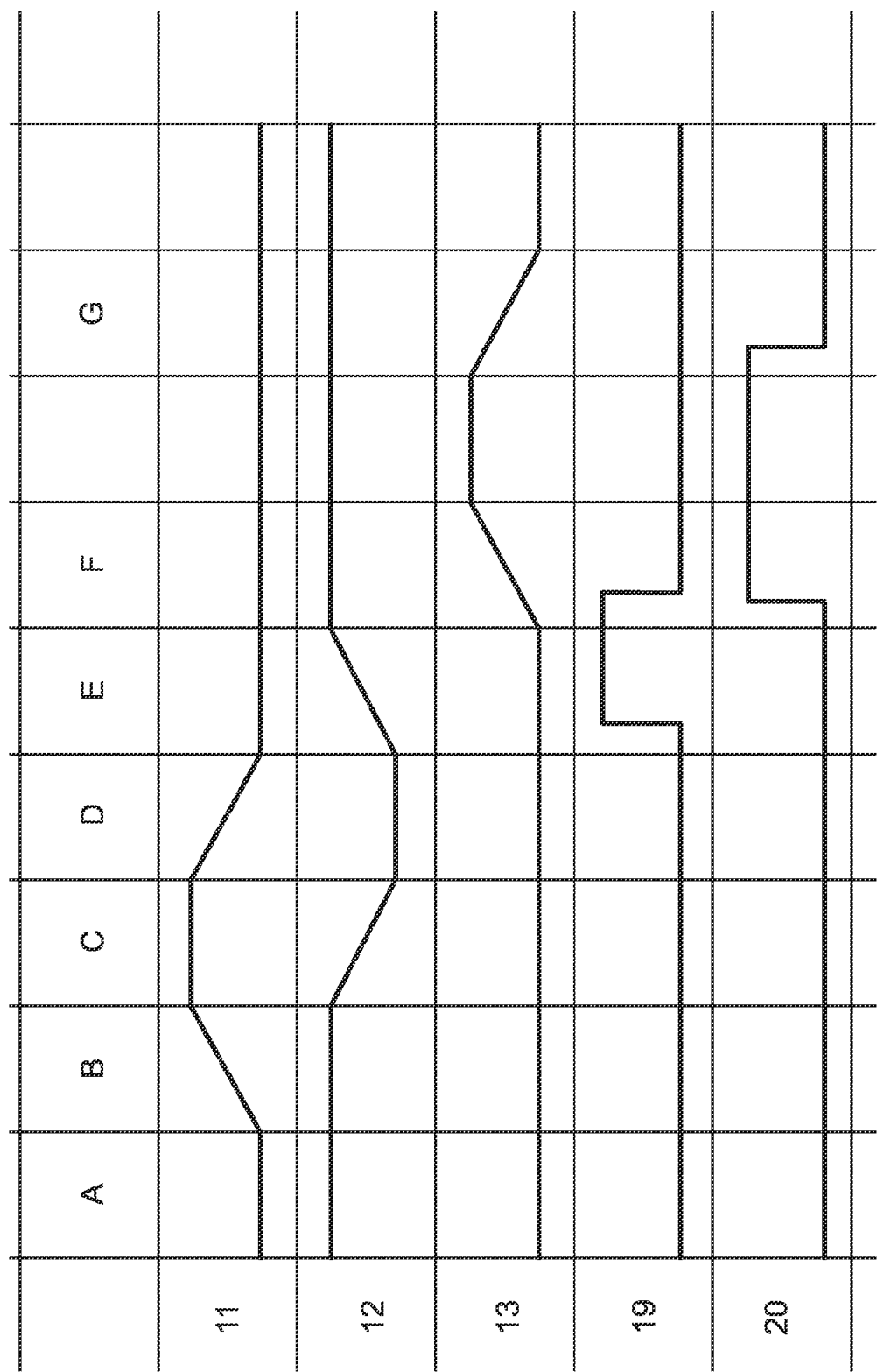
FIG. 4 is a schematic illustration of a function sequence in a device, in accordance with embodiments.

A sequence in a device according to the invention is schematically illustrated in FIG. 4. The elapsing time t is illustrated along the horizontal axis therein and, along the vertical axis, the respective component which is subject to or which carries out a modification, that is to say, the first actuator 11, the second actuator 12 and the third actuator 13, and the compressed air for the supply unit 19 and the compressed air for the processing channel 20.

In the time portion A, the device is in an initial position, in which the piston of the first actuator 11 is refracted and the pistons of the second actuator 12 and third actuator 13 are deployed. Subsequently, in the time portion B, the piston of the first actuator 11 is deployed in order to release a rivet from the rivet belt and to press it into the provision channel.

In C, the piston of the second actuator 12 is retracted in order to position a carrier portion of the piston upstream of the next securing element. Subsequently, in D, the piston of the first actuator 11 is retracted again.

In E, the piston of the second actuator 12 is deployed and consequently the securing element belt is pushed further. In the meantime, the compressed air for the supply unit 19 is additionally switched on in order to blow the securing element through the supply unit. In F, the compressed air for the supply unit 19 is stopped again and instead the compressed air for the processing channel 20 is switched on, whilst the piston of the third actuator 13 is retracted in order to produce the connection between the compressed air supply and processing channel. The securing element is now blown through the processing channel by the compressed air pressure which is suitable for the type of securing element.

Ultimately, in G, whilst the compressed air for the processing channel 20 is switched off again, the piston of the third actuator 13 is deployed again in order to be able to take up the next securing element into the processing channel 4.

As an alternative to the pneumatic cylinders set out, it is of course also possible to use, for example, electric cylinders for the actuators.

Embodiments consequently provide a device configured to supply securing elements to a processing unit which can handle securing elements of different types in an optimum manner.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE SIGNS

1 Securing element
2 Provision channel
3 Supply unit
4 Processing channel
5 Supply channel
6 Movable sliding member
7 Linear axis
8 Sensor
9 Separation unit
10 Securing element belt
11 First actuator
12 Second actuator
13 Third actuator
14 Compressed air source
15 Retention plate
16 Connection piece
17 Compressed air supply hose
18 Spring
19 Compressed air for supply unit
20 Compressed air for processing channel
t Time
A Initial position
B Deploy piston of first actuator
C Retract piston of second actuator
D Retract piston of first actuator
E Deploy piston of second actuator
F Retract piston of third actuator
G Deploy piston of third actuator

What is claimed is:

1. A device which supplies securing elements to a processing unit, the device comprising:
at least two provision channels configured to secure elements of different types, by way of which the securing elements are conveyed into a common supply unit; and
a processing channel through which the securing elements are conveyed individually from the supply unit to the processing unit via variable compressed air, the pressure of the compressed air being adjustable in accordance with a specific type of securing element.

2. The device of claim 1, wherein the securing elements are acted on with variable compressed air in the common supply unit.

3. The device of claim 1, wherein the securing elements are acted on with variable compressed air in the processing channel.

4. The device of claim 1, further comprising a valve configured to adjust the pressure of the compressed air.

5. The device of claim 1, wherein the valve comprises a proportional valve.

6. The device of claim 1, wherein the common supply unit comprises a supply channel and the provision channels open into different portions of the supply channel.

7. The device of claim 1, wherein the common supply unit comprises a movable sliding member which configured for movement to a respective one of the provision channels.

8. The device of claim 7, wherein the movable sliding member is guided along a linear axis in an electrically actuated manner.

9. The device of claim 1, further comprising a sensor configured to detect an arrival of a securing element in the processing channel, wherein the sensor is arranged at an end of the processing channel which faces the supply unit.

10. The device of claim 1, wherein the provision channels each have a separation unit configured to release the securing elements from a securing element belt and supply the securing elements to the provision channel.

11. The device of claim 10, wherein the separation unit has a first actuator configured to release the securing elements from the securing element belt and a second actuator configured to further transport the securing element belt.

12. The device of claim 1, further comprising an actuator configured to alternately connect the processing channel to one of the common supply unit and a compressed air source.

13. A device which supplies securing elements to a processing unit, the device comprising:
a plurality of provision channels configured to secure elements of different types, by way of which the securing elements are conveyed into a common supply unit, the provision channels each having a separation unit configured to release the securing elements from a securing element belt and supply the securing elements to the provision channel, each separation unit having a first actuator configured to release the securing elements from the securing element belt and a second actuator configured to further transport the securing element belt; and
a processing channel through which the securing elements are conveyed individually from the supply unit to the processing unit via variable compressed air, the pressure of the compressed air being adjustable in accordance with a specific type of securing element.

14. The device of claim 13, wherein the securing elements are acted on with variable compressed air in the common supply unit.

15. The device of claim 13, wherein the securing elements are acted on with variable compressed air in the processing channel.

16. The device of claim 13, further comprising a valve configured to adjust the pressure of the compressed air.

17. The device of claim 13, wherein the valve comprises a proportional valve.

18. The device of claim 13, wherein the common supply unit comprises a supply channel and the provision channels open into different portions of the supply channel.

19. The device of claim 13, further comprising a sensor configured to detect an arrival of a securing element in the processing channel, wherein the sensor is arranged at an end of the processing channel which faces the supply unit.

* * * * *